United States Patent [19]

Smith et al.

[11] Patent Number: 5,592,543
[45] Date of Patent: Jan. 7, 1997

[54] METHOD AND SYSTEM FOR ALLOCATING AGENT RESOURCES TO A TELEPHONE CALL CAMPAIGN

[75] Inventors: B. Scott Smith, Londonderry; Gerry L. Pearson, Nashua, both of N.H.

[73] Assignee: Davox Corporation, Westford, Mass.

[21] Appl. No.: 619,164

[22] Filed: Mar. 21, 1996

Related U.S. Application Data

[63] Continuation of Ser. No. 252,121, Jun. 1, 1994, abandoned.

[51] Int. Cl.$^6$ ........................................... H04M 3/00
[52] U.S. Cl. ........................ 379/265; 379/309; 379/92
[58] Field of Search ........................... 379/265, 266, 379/92, 93, 67, 211, 212, 201, 113, 112, 309

[56] References Cited

U.S. PATENT DOCUMENTS

| | | | |
|---|---|---|---|
| 4,951,310 | 8/1990 | Honda et al. | 379/309 |
| 5,025,468 | 6/1991 | Sikand et al. | 379/67 |
| 5,046,088 | 9/1991 | Margulies | 379/265 |
| 5,155,763 | 10/1992 | Bigus et al. | 379/309 |
| 5,179,589 | 1/1993 | Syu | 379/265 |
| 5,185,780 | 2/1993 | Leggett | 379/92 |
| 5,214,688 | 5/1993 | Szlam et al. | 379/67 |
| 5,295,184 | 3/1994 | Smith et al. | 379/92 |
| 5,297,195 | 3/1994 | Thorne et al. | 379/92 |
| 5,299,260 | 3/1994 | Shaio | 379/265 |
| 5,309,513 | 5/1994 | Rose | 379/266 |
| 5,327,490 | 7/1994 | Cave | 379/92 |
| 5,335,269 | 8/1994 | Steinlicht | 379/266 |
| 5,341,412 | 8/1994 | Ramot et al. | 379/92 |
| 5,343,518 | 8/1994 | Kneipp | 379/266 |
| 5,425,093 | 6/1995 | Trefzger | 379/309 |
| 5,436,965 | 7/1995 | Grossman et al. | 379/113 |

Primary Examiner—Krista M. Zele
Assistant Examiner—Scott Wolinsky
Attorney, Agent, or Firm—Daniel J. Bourque; Kevin J. Carroll

[57] ABSTRACT

A method and system for allocating agents possessing predetermined qualifying attributes to an outbound telephone call campaign is disclosed. The method includes the steps of assigning qualifying attributes to agents of a telephony system and further include the step of generating requests for agents possessing specific qualifying parameters within campaign call scripts. Agents meeting the agent request parameters are allocated to the outbound telephone call campaign for servicing call records within the outbound telephone call campaign.

29 Claims, 9 Drawing Sheets

METHOD AND SYSTEM FOR ALLOCATING AGENT RESOURCES TO A TELEPHONE CALL CAMPAIGN

This application is a continuation of application Ser. No. 08/252,121, filed Jun. 1, 1994, now abandoned.

FIELD OF THE INVENTION

This invention relates to telephony management systems, and more particularly, to a method for allocating agents with predetermined attributes to a telephone call campaign.

BACKGROUND OF THE INVENTION

Many business and customer services organizations utilize automated call distribution systems which route incoming calls to operators or agents in one or more various departments. Such systems efficiently screen incoming calls and are capable of providing initial, preliminary information to the customer by automated voice in response to system prompts. As a need for an agent occurs, the inbound telephone system distributes the incoming call to an agent based on availability.

Additionally, credit collection agencies and other types of businesses utilize outbound automated dialing systems to efficiently reach customers by automatically dialing telephone numbers contained within a preselected group of call records. Upon detecting a voice or answering machine, the automated dialing system connects the call to an agent, typically based on availability.

However, agents receive incoming or outbound calls without consideration of their capabilities or experience, thereby presenting instances in which assigned agents are incapable of servicing calls. Placing the call on hold while a more suitable agent is located is time consuming and cost inefficient, resulting in lost or abandoned calls.

In an attempt to direct specific incoming calls to selected agents, prior art systems utilize agent splits or hunt groups. These systems require incoming call campaigns to be preset such that specific calls are directed to preselected agents.

However, these systems are limited in that agents are not selected dynamically as the call campaign is active based on their attributes. Rather, agents are bound to the incoming call campaign prior to activation of the call campaign.

Other prior art systems utilize specific outbound dialing campaigns for directing predetermined outbound calls to preselected agents. These systems are limited in that the agents are assigned predetermined attributes and attached to specific campaigns. Generation of new campaigns are required to meet alternate attributes of an agent, thereby defeating the benefits associated with automated dialing systems.

Accordingly, what is needed is a method for allocating agents to service telephone call campaigns based on their experience and expertise, and not solely on first availability. Further, what is needed is a method for assigning agents to call campaigns as the campaign is active and in response to the campaign's requirements. Further, a method for modifying the agent's attributes after the campaign has started is needed.

SUMMARY OF THE INVENTION

In accordance with the present invention, a method for allocating agents to telephone call campaigns by a telephony system is provided for servicing call records contained within the telephone call campaign. The method includes the steps of providing agents to the telephony system and assigning qualifying agent attributes to each agent. The method further includes the step of providing a first telephone call campaign, including a plurality of call records, to the telephony system in a predetermined order. Preselected campaign call scripts, including requests for particular agents, are provided to the telephone call campaign for controlling the telephone call campaign processing.

The telephony system includes an agent resource manager which allocates agents possessing preselected agent attributes to the telephone call campaign in response to the requests from the preselected campaign call scripts.

Agents are assigned qualifying attributes to ensure that agents possessing the highest proficiency for a task are allocated to that particular task for increased call processing efficiency. Agents are categorized by a plurality of attribute classes and attribute values for which qualifies the agents to service particular types of call campaigns. Further, attribute levels are assigned to each attribute value for selecting the agent with the highest proficiency when a plurality of agents meet the campaign call script request.

Similarly, each campaign call script request comprises preselected agent parameters for agents possessing predetermined attribute classes and attribute values.

In accordance with a further aspect of the present invention, the process of providing campaign call scripts to the telephone call campaigns may be modified real-time, including after the telephone call campaign has been provided to the telephony system for processing of each call record.

Further, the preselected agent attributes assigned to each agent and the preselected agent parameters assigned to each campaign call script request may be modified real-time, including after the telephone call campaign has been provided to the telephony system.

Thus, call records contained within telephone call campaigns are serviced by agents possessing particular attributes and qualities having the highest proficiency for the task. Further, the allocation of agents to service the call records may be modified real-time including after the telephone call campaign has been provided to the telephony system.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
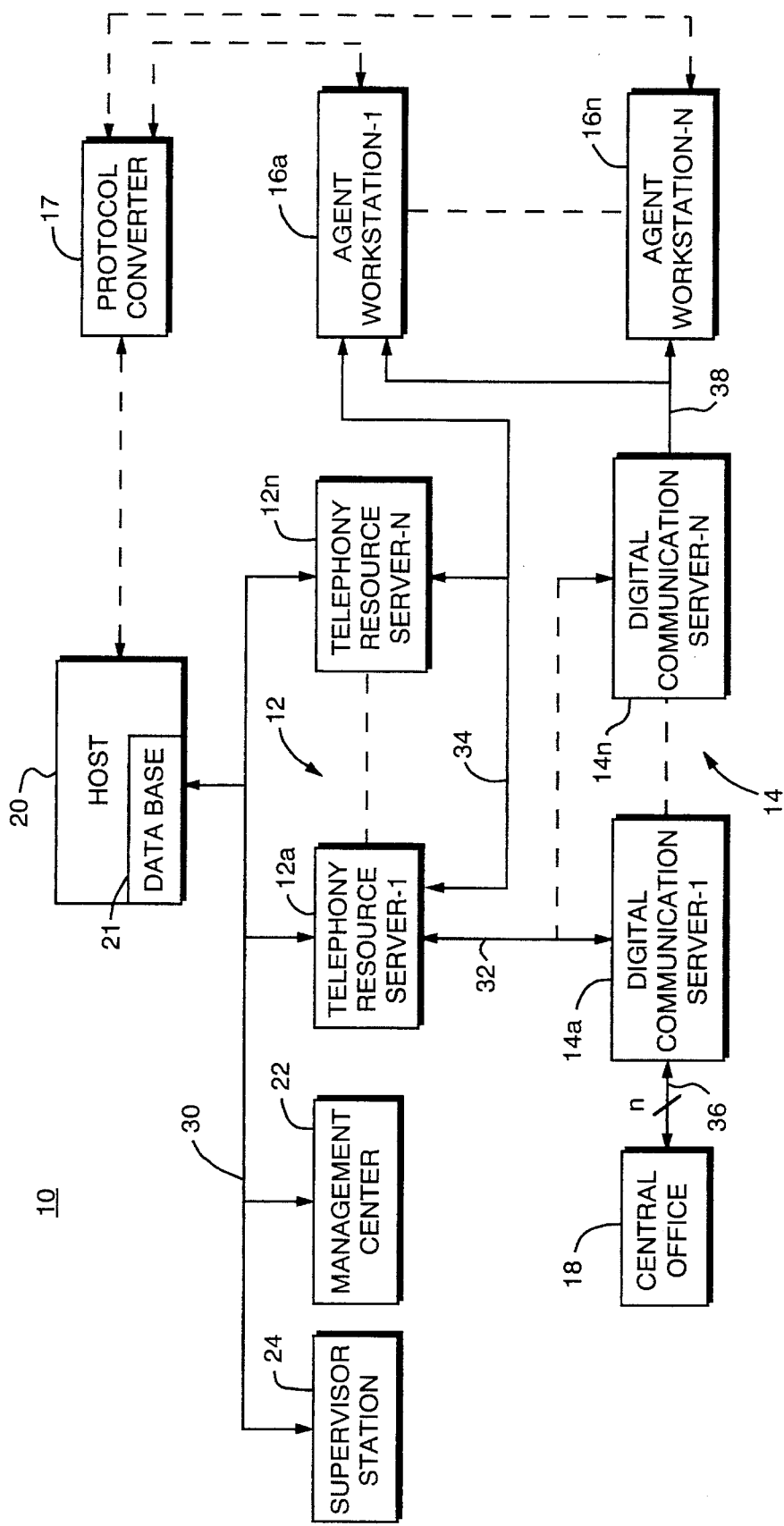
FIG. 1 is a diagrammatical representation of a telephony system capable of call processing in accordance with the present invention.

A telephony system 10, FIG. 1, capable of controlling and combining inbound call processing and outbound dialing automation includes a telephony resource server 12, coupled to a digital communication server 14 as well as a supervisor station 24 and management center 22. A telephony resource server 12, digital communication server 14, supervisor station 24 and management center 22, may be provided, for example, as the Davox Unison™ system manufactured by Davox Corporation, Westford, Mass. The system may provide a plurality of telephony resource servers 12a–12n, generally denoted as 12, for increased capabilities. Similarly, the system may provide a plurality of digital communication servers 14a–14n, generally denoted as 14.

Telephony resource server 12 initiates and maintains outgoing call campaigns and integrates incoming call center activities with a customer provided inbound call center which is coupled to the present system as another digital communication server. Outgoing call campaign parameters are generated by the supervisor/customer at the supervisor station 24 in response to menu-driven prompts. Call campaigns may be monitored by one or more management centers 22 once initiated by telephony resource server 12.

Telephony resource server 12 comprises various functions, discussed below in greater detail in conjunction with FIG. 2, which interact with the other components of the telephony platform 10 to perform the active call campaigns.

For outgoing call campaigns initiated by the supervisor/customer, telephony resource server 12 derives a group of call records from a database 21 within a host system 20 via signal path 30. The telephony resource server 12 processes the call records as directed by preselected system scripts and sends a request to digital communication server 14 to dial a telephone number contained within the call record.

Digital communication server 14 detects a dial tone, dials a telephone number over a trunk line 36 to the central telephone company switching office 18. Once a call is answered, the digital communication server forwards the voice portion of the call over voice path 38 to the headset of a preselected operator (not shown) located at one of a plurality of agent workstations 16a–16n, generally denoted as 16. The agents are preselected by the telephony resource server 12 in response to the initial call campaign parameters established by the supervisor/customer at the supervisor station 24.

In one embodiment, the agent at agent workstation 16 interfaces with the telephony resource server 12 over signal path 34 to obtain customer information from host system 20 over signal path 30. In another embodiment, the agent interacts directly with host 20 and data path 19 through protocol converter 17. In response, host system 20 sends data contained within each call record to the requesting agent workstation 16.

For inbound calls, the central office 18 sends incoming calls to digital communication server 14 via a plurality of T1 type preselected telephone lines within trunk 36 also known as an ACD (Automated Call Distributer) which is generally in existence at the customer location. In response, digital communication server 14 sends an incoming call signal over signal path 32 to telephony resource server 12 for inbound call processing. Telephony resource server 12 processes the incoming calls in accordance with preselected system scripts, discussed in greater detail in conjunction with FIG. 2, below, sending data over signal path 34 and directing digital communication server 14 to send the incoming call to a preselected agent at agent workstation 16 over voice path 38.

Figure 2A:
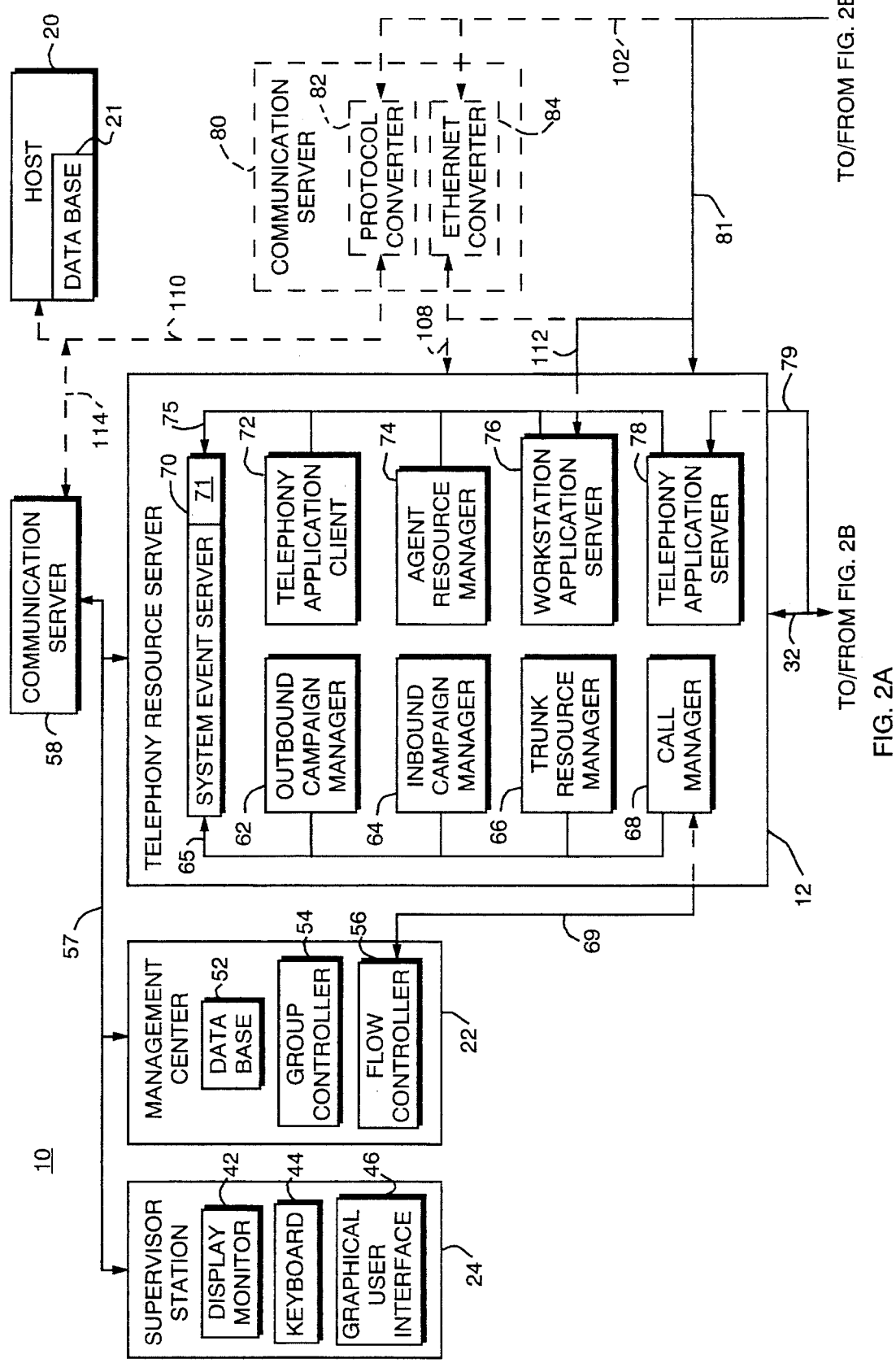
FIG. 2 is a diagrammatical representation showing a more detailed description of the telephony system of FIG. 1.
Figure 2B:
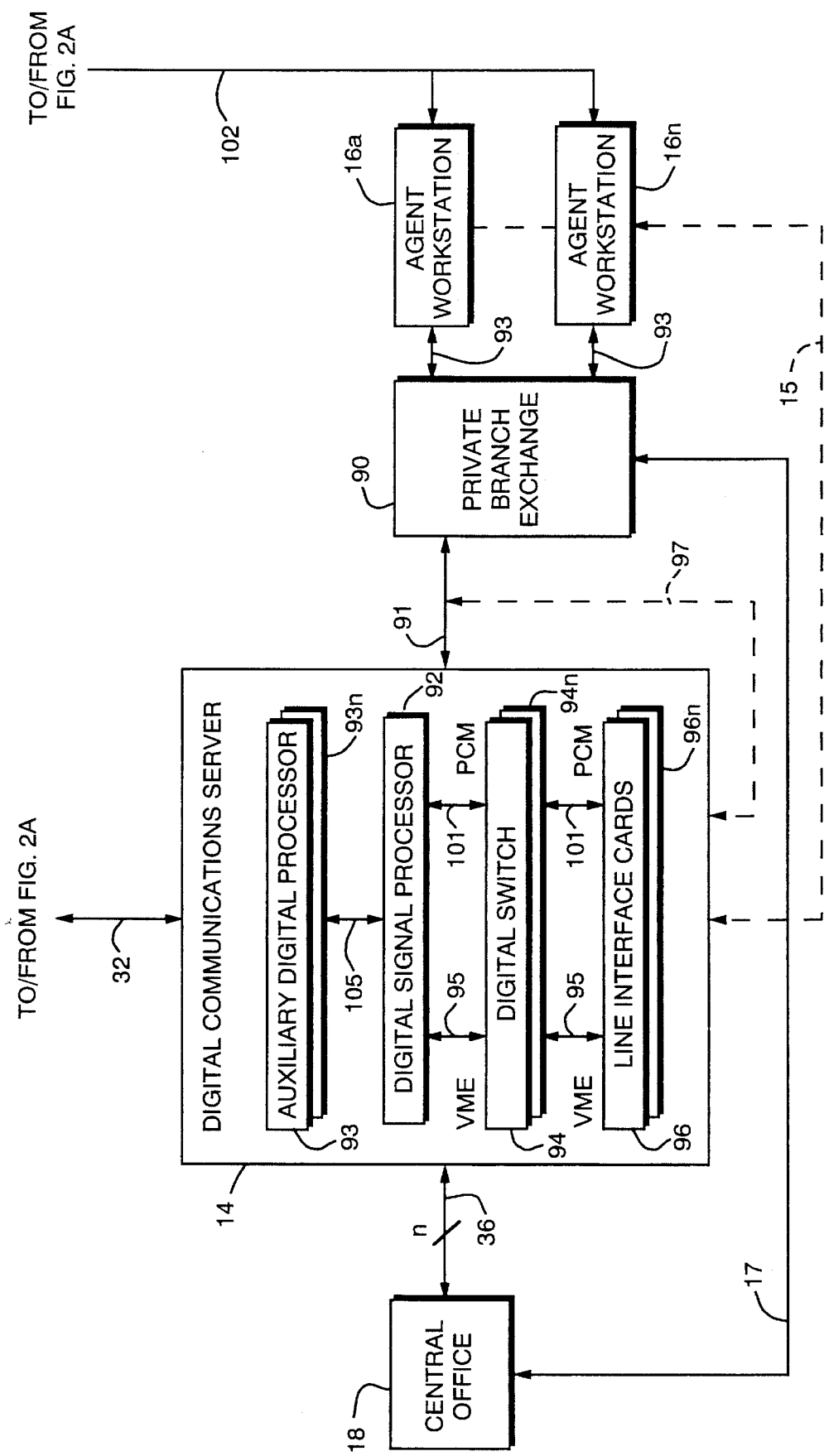

Referring now to FIG. 2, the functional components of the telephony platform 10 are discussed in greater detail. The supervisor/customer logs in at supervisor station 24 to establish inbound and outbound call campaigns. Supervisor station 24 typically includes a display monitor 42 featuring color bitmapped graphics, a keyboard 44 and a graphical supervisor/customer interface 46 and is further described in U.S. Pat. No. 5,343,518, issued on Aug. 30, 1994, and assigned to the assignee of the present invention and incorporated herein by reference. The supervisor station 24 may be provided, for example, as a SUN IPC model workstation manufactured by Sun Microsystems, Chelmsford, Mass.

The supervisor/customer establishes both inbound and outbound call campaigns in response to menu-driven prompts provided by the graphical supervisor/customer interface 46. System scripts are generated through a layered approach to define system behavior to the extent necessary for the desired call campaign. The highest layer interface is simply a form to be filled in by the supervisor/customer based on a specific call campaign application, for example, an outbound dialing call campaign versus an inbound call campaign. If a more complex set of criteria is necessary or desired, the supervisor/customer may be presented with a lower layer comprising more complicated forms to allow the supervisor/customer to better define the behavior of the telephony platform 10.

A system script is activated when a defined event occurs, such as a call record to dial, an incoming call is received, a function key is pressed at an agent workstation 16, etc. A script may also be bound by the supervisor/customer to specific events, being activated when the event is posted by the system, such as when a call is completed, a time of day, etc.

In addition to system scripts, the supervisor/customer generates other campaign parameters for each call campaign, such as, how the telephony resource server 12 should respond in the event of a busy dial tone, a no answer dial tone, etc. Further, agent and trunk parameters are defined by the supervisor/customer, discussed below in greater detail, as well as how the system should process the particular call campaigns. Once the call campaigns have been defined, the supervisor/customer notifies the telephony resource server 12 over signal path 30 that the particular call campaign is ready to start.

For an outbound call campaign, the outbound campaign manager 62 of telephony resource server 12 is directed to begin the call campaign. The outbound campaign manager 62 receives a group of call records from a host system 20, each call record including a telephone number for the outbound campaign manager 62 to dial. Depending on the type of host system 20 used to generate the batch of call records, a communication server 58 may be required to permit the host system 20 to communicate with the telephony resource server 12. Communication server 58 may be a protocol converter used for converting the communication protocol used by host system 20, typically a SNA or Token- Ring protocol, over bus 114, to the communication protocol utilized by the telephony resource server, typically a TCP/IP protocol, over bus 57.

The group of call records sent to the outbound campaign manager 62 is selected in response to one or more call record selection criteria initially generated by the supervisor/customer. The call record selection criteria defines and groups call records with similar characteristics within the call record database 21 of host system 20. As records are selected, system scripts initially generated by the supervisor/customer are activated to initiate dialing activity. The supervisor/customer may monitor the processing of the telephony system by the outbound campaign manager 62 at the management center 22. Management center 22 typically includes a database 52 for storing the call records downloaded from host system 20, a group controller 54 and a flow controller 56, and 21 is further described in part in U.S. Pat. No. 5,343,518, issued on Aug. 30, 1994, and assigned to the assignee of the present invention and incorporated herein by reference.

Flow controller 56 is provided for linking a plurality of call campaigns in a selected order and to apply the call campaigns to the telephony resource server 12 via the call manager 68 over signal path 69. The call manager 68 processes and formulates the outbound call campaign as directed by the preselected campaign parameters or system scripts, and forwards the outbound call campaign to the outbound campaign manager 62. The flow controller may also change the order in which the call campaigns are joined, all such changes being performed in real-time, even after being applied by the telephony resource server 12.

Group controller 54 is provided for monitoring the call campaign in real-time. The supervisor/customer may modify the particular outbound call campaign, as well as the inbound call campaign discussed below, by changing the preselected campaign parameters, system scripts or call record selection criteria. All such changes are performed in real time. The outbound campaign manager 62 provides a supervisor/customer interface to enable modifications to the outbound call campaign while the campaign is active in response to modifications made by the supervisor/customer.

The campaign parameters initially generated by the supervisor/customer further include campaign resources such as agents and/or outbound dialing trunks which possess predetermined resource attributes. A telephony application client 72 (discussed in more detail below sends a request to the agent resource manager 74 for an agent possessing specific agent attributes as defined by the supervisor/customer. The agent resource manager 74 monitors available agents possessing the specified agent attributes and upon availability allocates an agent possessing the specified attributes to the telephony application client 72.

Similarly, the telephony application client 72 sends a request to the trunk resource manager 68 for an outbound trunk possessing specific trunk attributes as defined by the supervisor/customer. The trunk resource manager 68 monitors available trunks possessing the specified trunk attributes such as least cost routing, ISDN trunk, direct line, etc. and allocates a trunk possessing the specified attributes to the telephony application client 72.

The agent resource manager 64 and the trunk resource manager 68 report particular agent log-ons and log-offs and trunk availabilities to the system event server 70, discussed below in greater detail, thereby providing real-time detailed information on the agent and trunk resources. By monitoring the stream of events occurring within the system, the outbound campaign manager 62 determines when it is time to initiate each new outbound dial. Once an agent resource and/or trunk resource is available to service the outbound dial, the outbound campaign manager 62 obtains a call record and initiates the telephony application client 72, preselected by the supervisor/customer at the start of the particular outbound call campaign, to process the call record.

The telephony application client 72 includes programs, campaign call scripts, or other processes that make use of the telephony platform 10 resources to perform telephony operations. The telephony application client 72 may be started by the outbound campaign manager 62 to process a call record or an outbound dialing application or the inbound campaign manager 64 to process an incoming call, or it may be started by the system event server 70 to perform some programmed response to a system defined event.

The telephony application client 72 sends a request to the telephony application server 78 to initiate a call according to the parameters generated by the outbound campaign manager 62, including a particular outbound trunk and agent to service the call record.

The request to generate an outbound call from the telephony application client 72 includes dialing instructions such as the maximum number of rings allowed before declaring a no answer. The telephony application server 78 further directs the digital communication server 14 to wait and listen for predetermined signal patterns and to return a status signal indicating what signal pattern was detected. Predetermined signal patterns include busy tones, voice detection, answering machine, modem/fax signals, etc.

The digital communication server 14 detects, reports, and generates a variety of signals, and detects specific states on a particular digital switch port using digital signal processor 92. Further, digital signal processor 92 is capable of playing digitized voice, as well as recording and play back of incoming voice via PCM bus 101. Digital voice messages are stored on disk, and transferred from the telephony resource server 12 over path 32, and referenced by campaign call scripts directed by telephony application server 78 over signal path 79. An auxiliary digital signal processor 93 may be used for expansion capability. Those skilled in the art will recognize that a plurality of auxiliary digital signal processors 93a may be used for increased expansion capability. Communication between the digital signal processor 92 and the auxiliary digital signal processors 93a is accomplished by a plurality of ethernet buses 105.

Digital signal processor 92 interfaces with digital switch 94 over VME communication bus 95 and PCM communication bus 101, described in co-pending U.S. patent application Ser. No. 08/252,336 filed on Jun. 1, 1994 and assigned to the assignee of the present invention and incorporated herein by reference. Digital switch 94 includes switch ports which may attach to T1 channel 36, agent headsets of agent workstations 16 and private branch exchange 90 extensions. A plurality of digital switches 94n may be used for increased switching capability.

Local internal switch 94 interfaces with line interface card 96 over VME communication bus 95 and PCM communication bus 101 and provides for rapid switching between an agent and the incoming/outgoing trunk lines. Line interface card 96 optionally interface with the agent workstations 16 directly over voice path 15 or via private branch exchange 90, over T1 telephone lines 97, to provide T1, analog and audio interface functions. A plurality of line interface cards 96n may be used for increased capability.

The private branch exchange 90 scans voice path 93 to agent workstation 16 to connect the outside third party, reached by an outbound call record dial, or an inbound calling party, to the headset of the agent preselected by the outbound campaign manager 62 or inbound campaign manager 64.

Three-way connections between the agent, outside third party and the agent's supervisor may be made, enabling features such as conferencing and consulting via the digital switch 94 and serviced by the telephony application server 78.

Upon receiving an outbound call over voice path 93 to the agent's headset, the system automatically provides customer information contained within the call record from the host.

In the preferred embodiment, agent workstations 16 are data terminals which utilize an ethernet network. Direct communication may be made with the telephony resource server 12 over bus 81, and in particular to the workstation application server 76 over bus 112 which also utilizes an ethernet network.

The workstation application server 76 interfaces with the host system 20 by means of a forms package which has the ability to access the call record database containing customer information and to forward the customer information to the workstation screen at the agent workstation 16. Further, the forms package has the ability to update this database based on responses by the agent at the agent workstation 16 to forms package prompts.

In an additional embodiment, the agent workstation 16 may be a dumb terminal utilizing a proprietary asynchronous communication protocol over line 102 requiring a communication server 80, illustrated in dashed lines, as a protocol converter. To permit communication with the telephony resource server 12 over bus 108, and in particular, with the workstation application server 76, over bus 112, proprietary asynchronous line 102 is converted by ethernet converter 84 to an ethernet network thereby allowing compatibility with workstation application server 76. For direct communication with the host system 20 over bus 110, proprietary asynchronous line 102 is converted to the protocol utilized by host system 20, typically SNA or Token-Ring, by protocol converter 82. The telephony resource server 12 further includes a system event server 70 for providing the supervisor/customer real-time access to the current status and detail information on campaigns, agents, trunks, etc. The supervisor/customer may access this information through graphical supervisor/customer interface 46 at the supervisor workstation 24, as well as through a standard spread sheet or reporting package.

The system event server 70 is the central focal point for posting system events and maintaining real-time information as to current system activity. All of the functional components within the telephony resource server 12 communicate with the system event server 70 as indicated by signal paths 65 and 75 to maintain current system activity. All system events which can be posted by the system are predefined by the supervisor/customer and posted in an event database 71 within the system event server 70 as specific events occur. As system events are posted in the event database, system statistics, stored in the statistics database within the system event server 70, are updated thereby providing the supervisor/customer with realltime system information.

For an inbound call campaign, the supervisor/customer first establishes an inbound call campaign at the supervisor station 24 in the same manner as for an outbound call campaign, described above. The supervisor/customer specifies campaign parameters, agent attributes, system scripts and campaign resources. For example, an inbound call campaign may generate a system script which would wait for an incoming ring, seize a preselected originating trunk, request an agent having certain attributes, and place the caller on hold until an agent becomes available. A different system script may direct originating calls into the central office 18 to bypass the digital communication server 14 and directly connect to the private branch exchange 90 over T1 telephone line 17, for forwarding to a preselected agent at agent workstation 16.

Inbound call campaigns generated by the supervisor/customer are managed by the inbound campaign manager 64 within the telephony resource server 12. The inbound campaign manager interfaces with the digital communication server 14 over signal path 32 upon detection of incoming calls by the digital communication server 14. The inbound campaign manager 64 receives campaign resources from the trunk resource manager 68 and agent resource manager 74 and initiates inbound dialing system scripts as directed by the inbound call campaign.

Generally speaking, there are three types of agent attributes which may be established. These include static attributes, local attributes and dynamic attributes. Static attributes are set up once when an agent is first enrolled and are typically attributes which are not frequently changed. Typically, static agent attributes are set up by the supervisor and include, for example, characteristics such as foreign language capabilities.

Local attributes are set up by the agent at the time of log in, perhaps in response to system queries or questions. For example, local attributes typically have duration the log in day or the log in campaign and may be further time based. Examples of local attributes are which campaigns the agent wishes to work on; or goals for the day such as the dollar value of overdue accounts which the agent wishes to collect.

Finally, dynamic agent attributes are changed by the telephony system itself in order to maintain system performance and include attributes such as campaign attributes, which allow the agent to handle multiple campaigns even though the agent may have logged on to only one or two actual campaigns.

Figure 3A:
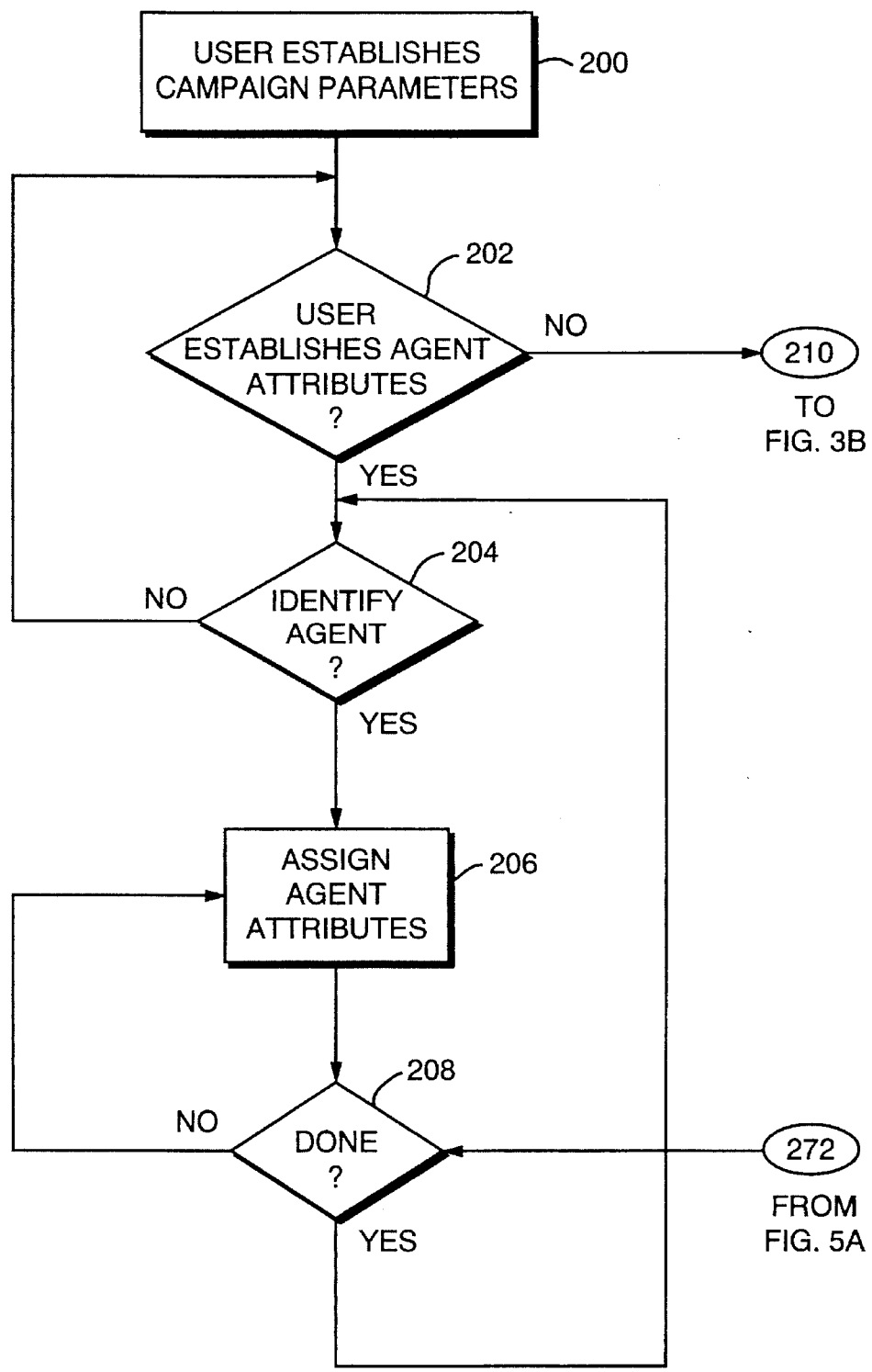
FIG. 3A is a flow diagram showing the steps of providing qualifying attributes to agents which are part of the telephony system of FIG. 1.

Referring now to FIG. 3A, a method for allocating agent resources having predetermined attributes to an outbound or inbound telephone call campaign is provided.

Typically, to processing call campaigns, the supervisor/customer establishes system operating attributes, step 200. However, agent attributes can be changed dynamically while a call campaign is operative. Qualifying agent attributes may be established, step 202, for the plurality of operators/agents who will be servicing outbound or inbound telephone calls, or system scripts may be preselected, discussed below in greater detail.

After agents requiring qualifying attributes have been identified, step 204, agent attributes are assigned to each identified agent, step 206. Typically, a plurality of attributes are assigned, as shown at steps 206 and 208, for addressing situations in which more than one agent is qualified to service a particular call. Additional agents may be subsequently identified, step 208, and assigned qualifying attributes until all agents have been assigned agent attributes.

Figure 3B:
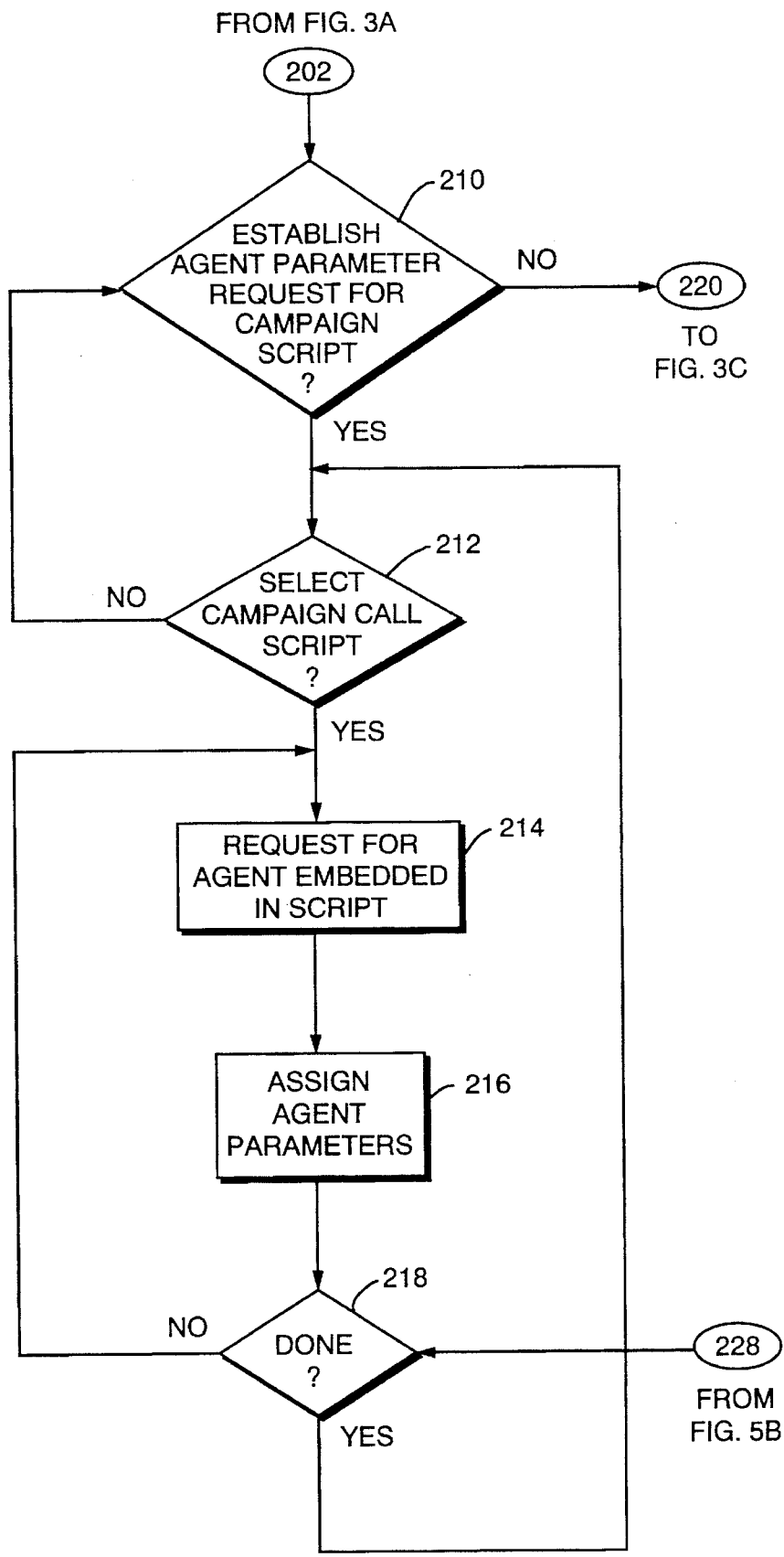
FIG. 3B is a flow diagram showing the steps of assigning agent parameters to campaign call script requests.
Figure 3C:
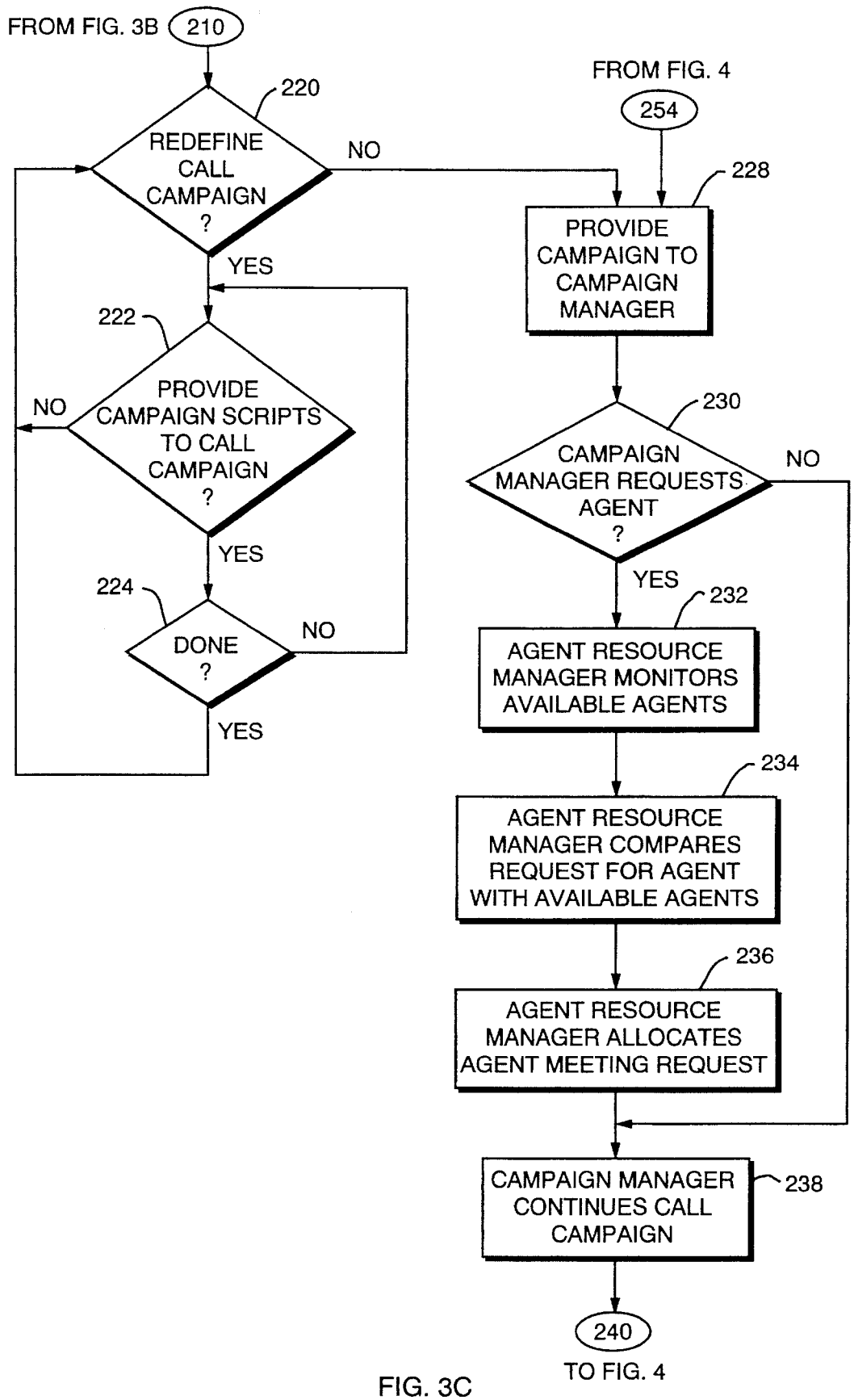
FIG. 3C is a flow diagram showing the steps of allocating agents to telephone call campaigns.
Figure 4:
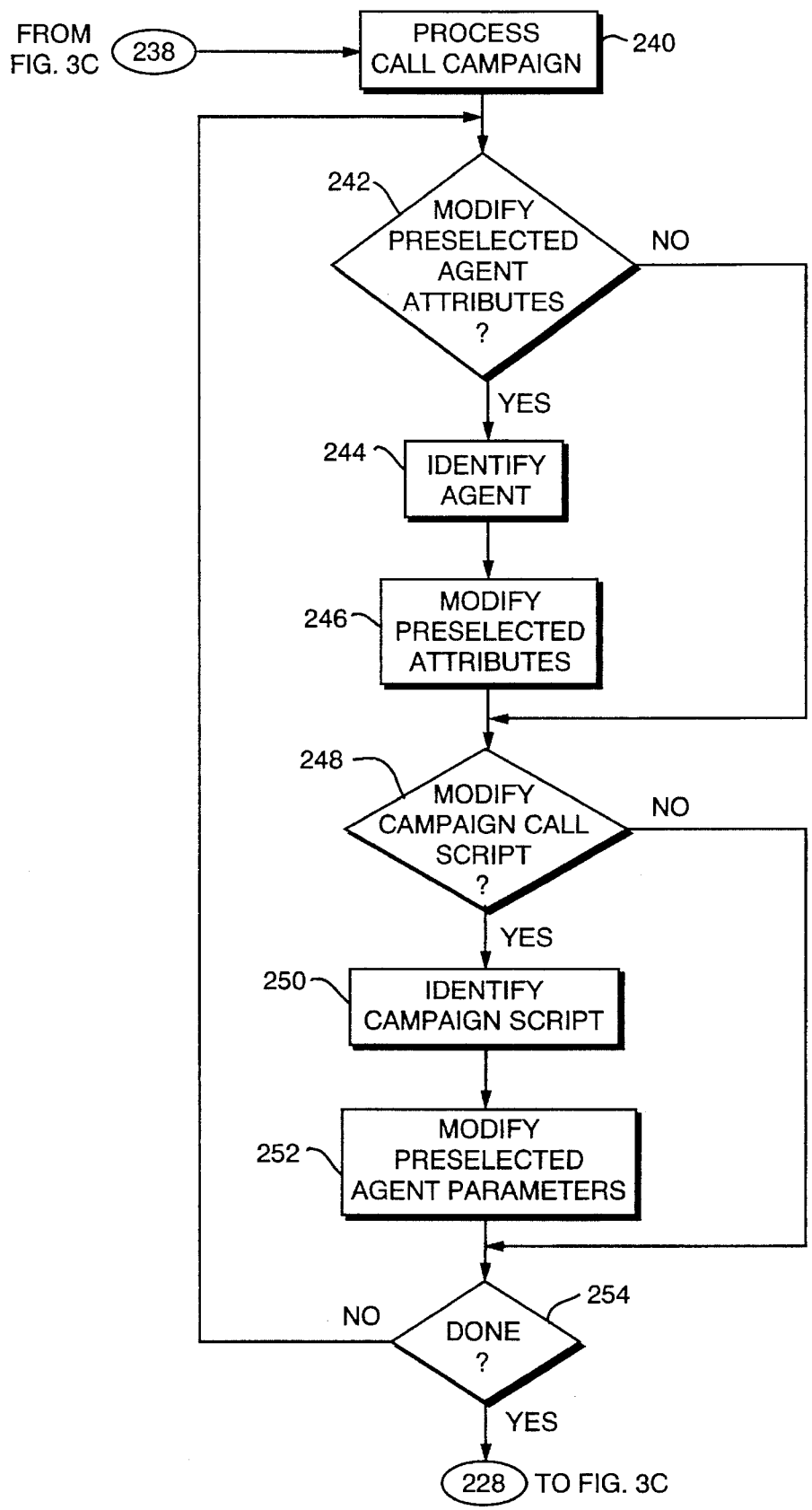
FIG. 4 is a flow diagram showing the steps of modifying preselected agent attributes and preselected agent parameters, real-time, after the call campaign has been provided to the telephony system for processing of call records.

The supervisor/customer may also establish agent resource requests to attach to campaign call scripts, step 210, FIG. 3B. Initially, a set of default campaign call scripts is provided at the formation of each new call campaign for defining the system behavior of the telephony system while processing each call campaign. The default campaign call scripts may be used or other predefined campaign call scripts may be selected for the new call campaign, step 212.

Campaign call scripts typically include requests for agents possessing particular attributes to service a group of specific call records. At step 214, a request for a particular type agent is generated to attach to the campaign call script. Agent parameters corresponding to qualifying agent attributes are assigned to the campaign call script request at step 216. The selected agent parameters corresponding to qualifying agent attributes can be based on the type of script, such as an expert script, based on information in the call records such as language and based on a protocol basis. In the life of a call, certain requests for agents are made before and after a call is started. For example, during outbound dialing the system will request an agent after the line has been dialed and an answer has been detected. For outbound calls which are being made from a redial call queue wherein a customer has previously been called but has hung up, an agent is requested and made available before dialing to be sure that the agent is immediately available when the party answers the call.

A call script or call record generally requests a "class" of an agent attribute. For example, the record may request an agent with an attribute of class "language" having the value "French". Agent attributes, however, may be further divided into value such as high proficiency, moderate proficiency and low proficiency. In the case of available agents having the attribute "French" within class "languages" with varying degrees or levels of proficiency, the system will assign the agent with the highest level or value of proficiency to service the call. The call record or script, however, may also include an embedded "minimum" level or proficiency requirement in which case the system will provide only such an agent meeting the minimum values. Typically, a plurality of agent attributes are assigned to the campaign call script request as shown at steps 214, 216 and 218. Additional campaign call scripts may be selected and assigned campaign call script requests at step 212.

A call campaign may be redefined, step 220, by providing additional campaign call scripts or by modifying the current default campaign call scripts, step 222. Once all the campaign call scripts have been provided to the call campaign, step 224, the call campaign is provided to the outbound, or inbound, campaign manager, step 228, for processing of the call campaign.

Once a call campaign has been initiated (the campaign is "applied") requests to the agent resource manager for an agent with the selected attributes, step 230, are directed by the campaign call scripts, or continues the call campaign, step 238, for an outbound dialing or an inbound call processing if an agent is not required. Prior to receiving the agent request from the call script, the agent resource manager is continuously monitoring available agents, step 232. As the agent resource manager receives the request from the call script for an agent possessing particular qualifying attributes, the agent resource manager compares the agent request with available agents, step 234. Upon identifying an agent possessing particular agent qualifying attributes meeting the request from the campaign manager, the agent resource manger allocates the identified agent to the call campaign for servicing of the call records contained within the call campaign, step 236. The call script subsequently continues the call campaign at step 238, for an inbound call processing or an outbound dialing and forwards the call campaign to the other components of the telephony platform system for processing of the call campaign.

After the call campaign has been provided to telephony platform system for processing, step 240, the preselected agent attributes may be modified, step 242, at the supervisor station through the graphical supervisor/customer interface. The supervisor/customer identifies a particular agent, step 244, and modifies the preselected attributes as desired, step 246.

Further, the campaign call scripts may be modified, step 248, after the telephony platform process has begun processing the call campaign. The supervisor/customer identifies the particular campaign call script, step 250, and modifies the preselected agent attributes, step 252.

Upon completing modifications to the preselected agent attributes and/or preselected agent attributes, step 254, the call campaign is returned to the campaign manager if modifications were made, for repeating the steps for allocating agents to the call campaign.

Figure 5A:
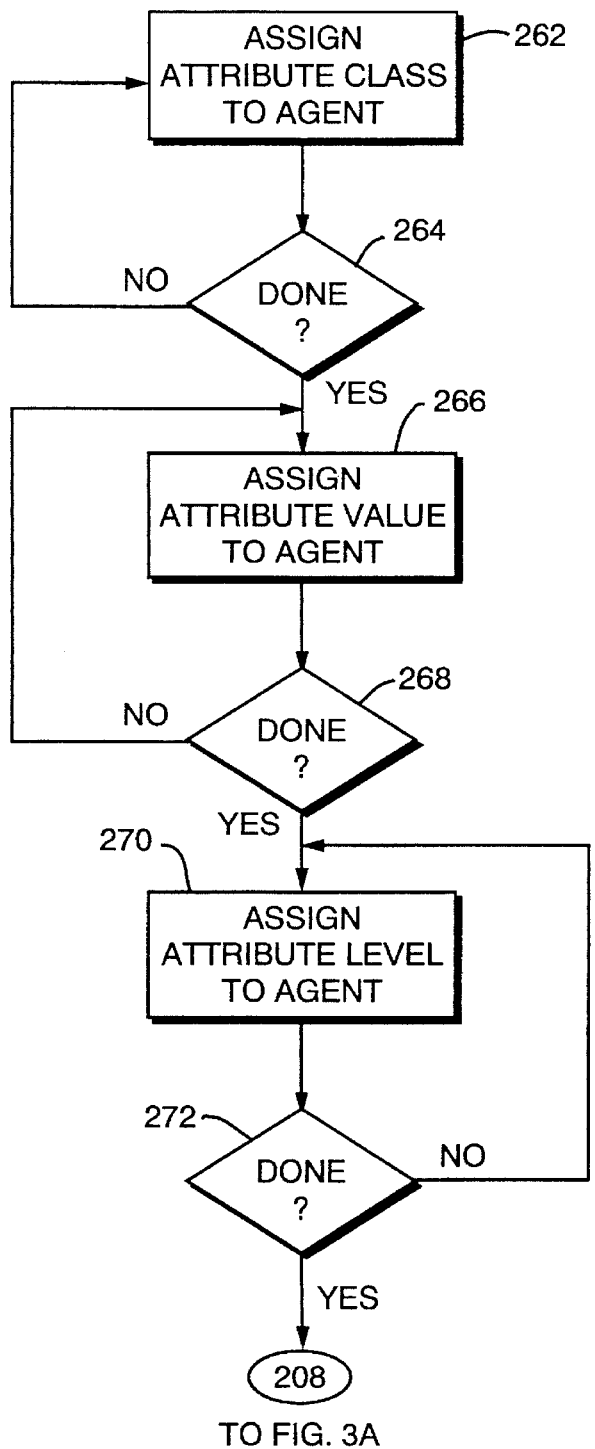
FIG. 5A is a flow diagram showing in greater detail step 206, FIG. 3A, of assigning qualifying attributes to agents.

Referring to FIG. 5A, a more detailed flow diagram of step 206 in FIG. 3A is provided showing the steps used for assigning agent attributes to identified agents. Agents located at the agent workstations are characterized by a set of attributes taken from a class assigned to each identified agent. Each agent may be assigned a plurality of attribute classes for a variety of types of call records which the agent may be qualified to service as shown at steps 262 and 264. Examples of attribute classes may include "DEPARTMENT", "LANGUAGE" etc.

Each attribute class includes a number of attribute values which may be assigned to each agent, for further characterizing each agent. A plurality of attribute values may be assigned to each agent, steps 266, 268 for meeting specific requests for agents possessing a particular attribute class/attribute value. For example, within attribute class "DEPARTMENT", attribute values may include "CUSTOMER SERVICE", "SALES", etc. and within attribute class "LANGUAGE", attribute values may include "SPANISH" and "GERMAN". An individual agent may possess any combination of these attributes, in which case a client requesting a Spanish-speaking agent may also get an agent who can also speak German.

Each attribute value includes an attribute level assigned to each agent, step 270, for situations in which more than one agent satisfies the agent request. An available agent possessing the highest level for that attribute value is the agent selected by the agent resource manager to meet the agent request. To continue the previous example, multilingual agents can be assigned attribute levels according to their fluency in each language. An agent request for a Spanish-speaking agent will result in the available agent that speaks the language, Spanish, most fluently. As a plurality of attribute values are assigned to each agent, a plurality of attribute levels are assigned to each attribute value, step 272.

An agent request may specify multiple attribute class/value pairs, in which case the selected agent must possess all of the specified attributes. If more than one agent meets these criteria, the agent having the highest attribute level for the attribute class/value pair specified first in the agent request, is the agent that will be selected. If more than one agent has this same attribute level, the agent having the highest attribute level for the attribute specified second will be selected. If there is still more than one qualified agent, the least recently used agent is the agent selected to meet the agent request.

Figure 5B:
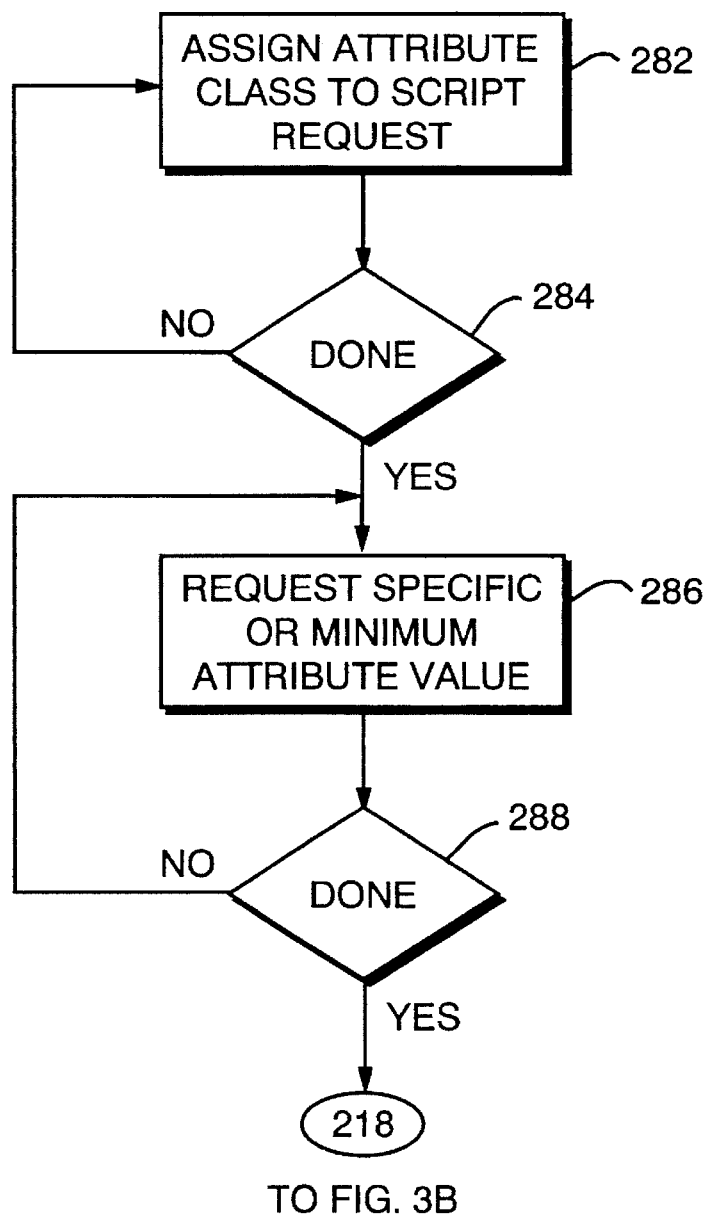
FIG. 5B is a flow diagram showing in greater detail step 216, FIG. 3B, of assigning agent parameters to a campaign call script request.

Referring to FIG. 5B, the steps for assigning agent parameters to agent requests of a campaign call script step 216 in FIG. 3B, are discussed in greater detail. An attribute class is assigned to the agent request, step 282, the types of classes coinciding with the types of attribute classes assigned to the agents, above. A plurality of attribute classes may be assigned to each agent request as shown in step 284. An attribute value is also assigned to the agent request, step 286, the type of values also coinciding with the agent values assigned to the agents, above. Additional attribute values may be assigned, step 288. Upon completing the assignment of attribute classes/values to the selected agent request, the supervisor/customer may establish agent attributes for additional campaign call scripts.

Modifications and substitutions by one of ordinary skill in the art are considered to be within the scope of the present invention which is not to be limited except by the claims which follow.

What is claimed is:

1. A method for allocating an agent resource to an outbound telephone call campaign in a telephony system, for servicing a plurality of call records, said telephony system including an agent resource manager for allocating said agent resource to said outbound telephone call campaign, said method comprising the steps of:

providing a plurality of agent resources to be managed by said telephony system, each agent resource of said plurality of agent resources characterized by at least one agent attribute;

providing at least one outbound telephone call campaign to said telephony system, said outbound telephone call campaign including a plurality of call records, each of said plurality of call records including a telephone number to be dialed by said telephony system;

providing at least one system script to said at least one outbound telephone call campaign, for processing said at least one outbound telephone call campaign;

providing at least one agent resource request with said at least one system script, for requesting from said agent resource manager said at least one agent resource according to said at least one agent attribute;

said step of providing said at least one agent resource request further including the step of providing at least one agent parameter corresponding to said at least one agent attribute of said at least one agent resource to be requested; and providing at least one agent resource including said at least one agent attribute to said at least one outbound telephone call campaign by said agent resource manager in response to said agent resource manager receiving said agent resource request including at least one agent parameter corresponding to said at least one agent attribute of said at least one agent resource.

2. The method of claim 1 wherein said step of providing said at least one agent parameter includes providing at least one agent parameter corresponding to a static agent attribute.

3. The method of claim 1 wherein said step of providing said at least one agent parameter includes providing at least one agent parameter corresponding to a dynamically changeable agent attribute.

4. The method of claim 1, further including the step of modifying at least one of said at least one agent resource request, after the step of providing at least one agent resource request.

5. The method of claim 1, further including the step of modifying said at least one preselected agent parameter provided to said agent resource request after the step of providing at least one agent resource request.

6. The method of claim 1, further including the step of modifying said at least one agent attribute provided to said each agent resource, after the step of providing at least one agent attribute to each agent resource.

7. The method of claim 1 wherein said step of providing said at least one agent parameter includes providing at least one agent parameter corresponding to a local agent attribute.

8. The method of claim 7 wherein said local agent attribute is based on one of a campaign and time.

9. The method of claim 1, wherein said at least one agent attribute is associated with at least one agent attribute class.

10. The method of claim 9, wherein said at least one agent attribute class includes at least one agent attribute value.

11. The method of claim 10, wherein said at least one agent attribute value includes at least one agent attribute level.

12. The method of claim 11, wherein said agent attribute class, said agent attribute value and said agent attribute level, define said at least one agent attribute of said each agent resource, for qualifying said at least one agent resource when said at least one agent parameter includes a corresponding said agent attribute class, said agent attribute value, and said agent attribute level.

13. The method of claim 12, wherein the step of providing said at least one agent resource having at least one attribute corresponding to said at least one agent parameter of said agent resource request, further includes the step of selecting a preferred agent resource possessing a highest available said at least one agent attribute level, from a number of agent resources having at least one agent attribute class and at least one agent attribute value which matches said at least one agent parameter of said agent resource request.

14. A method for allocating at least one agent resource of a plurality of agent resources to at least one outbound telephone call campaign in a telephony system having an agent resource manager, said method comprising the steps of:

assigning at least one dynamically alterable agent attribute to each agent resource of said plurality of agent resources;

providing said at least one outbound telephone call campaign to said telephony system;

providing at least one system script to said at least one outbound telephone call campaign, whereby said at least one system script defines the processing of calls in said at least one outbound telephone call campaign to be performed by said telephony system;

establishing at least one agent resource request within said at least one system script, said at least one agent resource request including at least one agent parameter corresponding to at least one dynamically alterable agent attribute of at least one agent resource;

commencing processing of said at least one outbound telephone call campaign in said telephony system; and allocating at least one agent resource to said at least one outbound telephone call campaign in response to said agent resource manager receiving said at least one agent resource request, whereby said agent resource manager allocates at least one agent resource having said at least one dynamically alterable agent attribute corresponding to said agent parameter of said at least one agent resource request in said at least one system script.

15. The method of claim 14, wherein said outbound call campaign includes a plurality of call records provided to said telephony system in a predetermined order.

16. The method of claim 14, further including the step of modifying said at least one dynamically alterable agent attribute assigned to each agent resource, after the step of commencing processing of said at least one campaign.

17. The method of claim 14, further including the step of modifying said at least one dynamically alterable agent parameter of said at least one agent resource request in said at least one system script, after the step of commencing processing of said at least one campaign.

18. The method of claim 14, wherein assigning said at least one dynamically alterable agent attribute includes assigning at least one agent attribute class.

19. The method of claim 18, wherein assigning said at least one dynamically alterable agent attribute includes assigning at least one agent attribute value within said at least one agent attribute class, for further defining said at least one agent attribute.

20. The method of claim 18, wherein assigning said at least one dynamically alterable agent attribute includes assigning at least one agent attribute level within said at least one agent attribute value, for indicating an ability level within said at least one agent attribute value of said at least one agent attribute class.

21. The method of claim 14, wherein said step of assigning at least one dynamically alterable agent attribute includes assigning at least one agent attribute class to each agent resource.

22. The method of claim 21, wherein said step of assigning at least one dynamically alterable agent attribute includes assigning at least one agent attribute value within said at least one agent attribute class to each agent resource.

23. The method of claim 22, wherein said step of assigning at least one dynamically alterable agent attribute includes assigning at least one agent attribute level within said at least one agent attribute value of said at least one agent attribute class, wherein said at least one agent attribute level indicates an ability level within said at least one agent attribute value of said at least one preselected agent attribute class.

24. The method of claim 23, wherein said step of allocating at least one agent resource to said at least one outbound telephone call campaign includes allocating at least one agent resource having at least one agent attribute class and at least one agent attribute value which matches said at least one agent parameter of said at least one agent resource request.

25. The method of claim 24, wherein said step of allocating at least one agent resource having at least one agent attribute class and at least one agent attribute value matching said at least one agent parameter of said at least one agent resource request includes allocating at least one agent resource having a highest agent attribute level within the matching said at least one agent attribute class and at least one agent attribute value.

26. A system for allocating at least one agent resource of a plurality of agent resources to at least one outbound telephone call campaign comprising:

at least one host, for storing a plurality of call records;

a plurality of agent workstations, for handling a plurality of telephone calls, wherein each agent workstation is associated with at least one agent resource having at least one agent attribute;

at least one telephony resource server in communication with said at least one host and said plurality of agent workstations, for initiating and managing at least one outbound telephone call campaign, said at least one telephony resource server including at least one agent resource manager, for allocating at least one outbound telephone call campaign to at least one agent workstation having an associated agent resource with at least one agent attribute designated in a request received by said agent resource manager;

at least one communications server in communication with said at least one telephony resource server and said plurality of agent workstations, for establishing communication between at least one agent workstation and at least one telephone call; and at least one supervisor station in communication with said at least one telephony resource server, for allowing at least one supervisor to assign said at least one agent attribute to each agent resource and to establish said desired at least one agent attribute for said at least one outbound telephone call campaign.

27. The system of claim 26, wherein said at least one telephony resource server includes an outbound campaign manager in communication with said at least one agent resource manager, for managing at least one outbound telephone call campaign.

28. The system of claim 26, wherein said system is adapted to manage at least one inbound telephone call campaign.

29. The system of claim 26, further including a management center coupled to said at least one telephony resource server, for monitoring said at least one outbound telephone call campaign during processing by said at least one telephony resource server.

* * * * *